Figure 1:
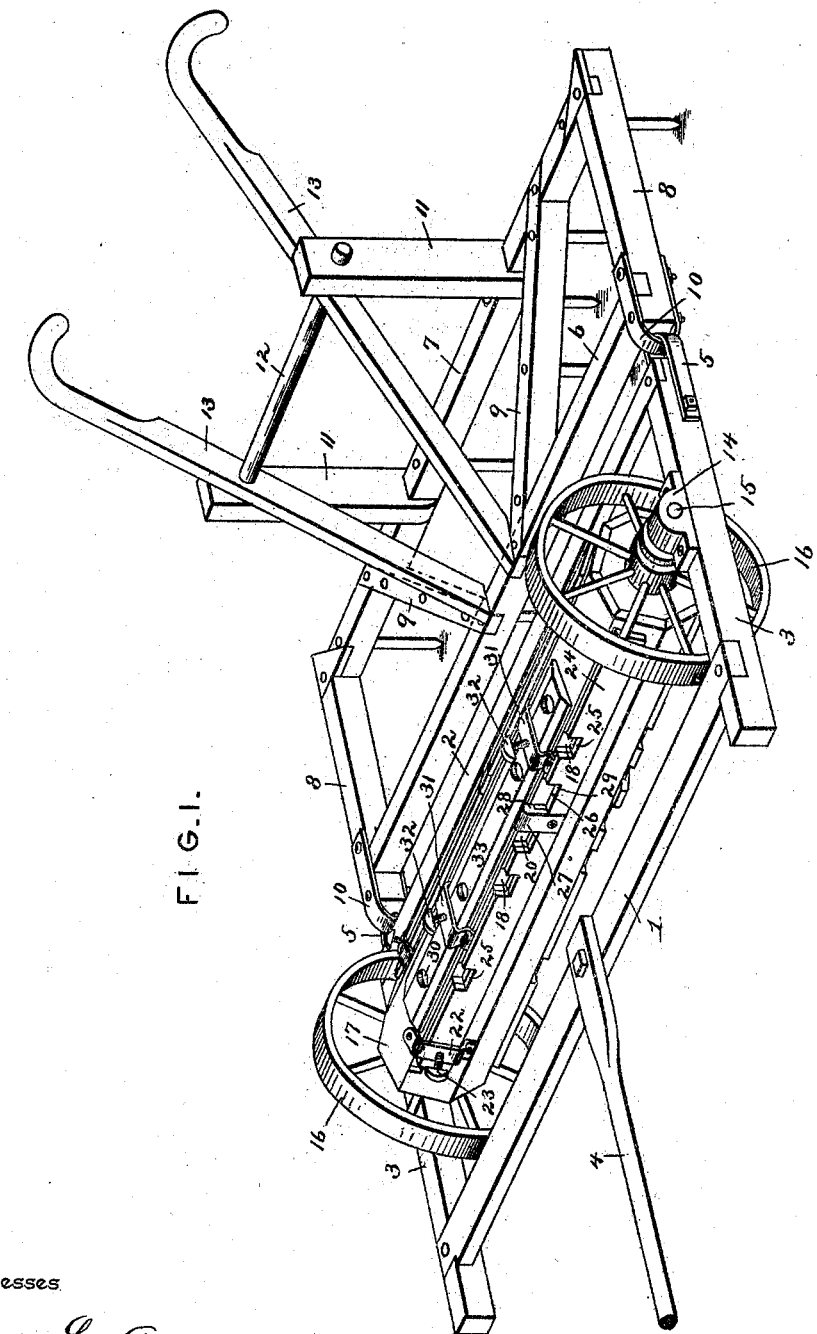

(No Model.)
2 Sheets—Sheet 1.

J. PIPES.
COMBINED PLANTER AND FERTILIZER DISTRIBUTER.

No. 502,379.
Patented Aug. 1, 1893.

Witnesses
Harry L. Amer.
H. S. Duvall.

Inventor
Joseph Pipes.
By his Attorneys,
C. A. Snow & Co.

(No Model.) 2 Sheets—Sheet 2.
J. PIPES.
COMBINED PLANTER AND FERTILIZER DISTRIBUTER.
No. 502,379. Patented Aug. 1, 1893.
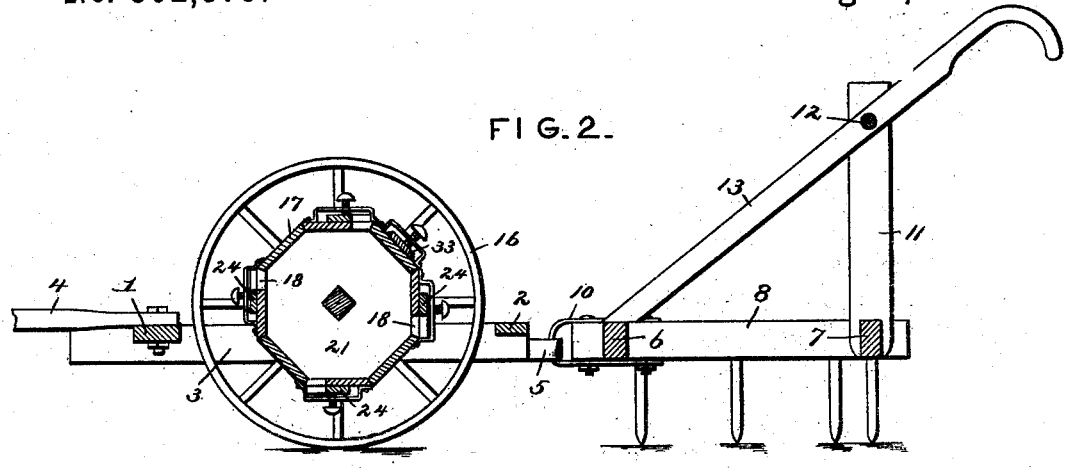
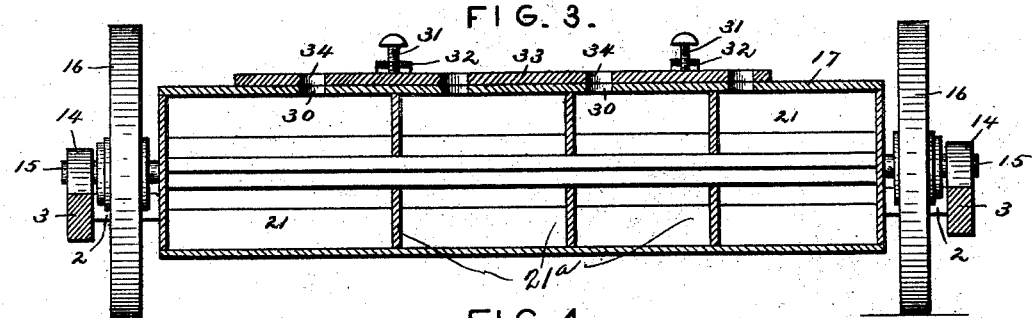
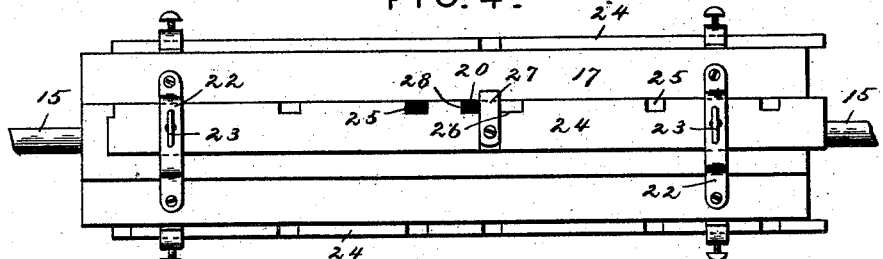
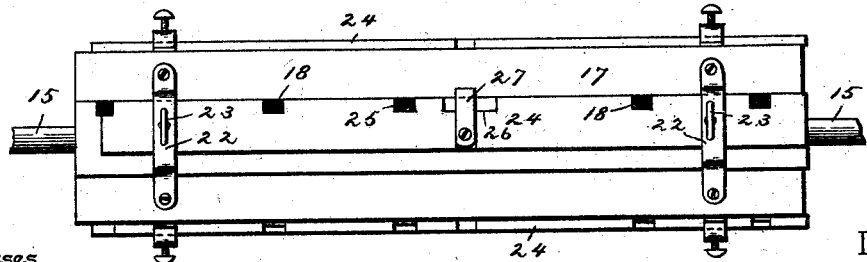
Witnesses
Harry L. Amer
W. S. Duvall
By his Attorneys,
C. A. Snow & Co.
Inventor
Joseph Pipes.

UNITED STATES PATENT OFFICE.

JOSEPH PIPES, OF ARCADIA, LOUISIANA.

COMBINED PLANTER AND FERTILIZER-DISTRIBUTER.

SPECIFICATION forming part of Letters Patent No. 502,379, dated August 1, 1893.

Application filed February 9, 1893. Serial No. 461,596. (No model.)

*To all whom it may concern:*

Be it known that I, JOSEPH PIPES, a citizen of the United States, residing at Arcadia, in the parish of Bienville and State of Louisiana, have invented a new and useful Combined Planter and Fertilizer-Distributer, of which the following is a specification.

My invention relates to improvements in agricultural-machines, and to that special class thereof known as combined planters and fertilizer-distributers.

The objects in view are to provide a machine of cheap and simple construction of the above class, and therefore adapted to distribute grain and fertilizer; and to so construct the machine as to be readily converted from a broadcast grain and fertilizer-distributer to a drill; to provide means for regulating the distance between the drills when the machine is so used; and for readily converting the machine from a broadcast distributer or planter to a drill adapted to drill grain, and if desired, simultaneously with the same to drop fertilizer; and finally to provide means for covering said grain and fertilizer after it has been dropped.

With these and various other objects in view the invention consists in certain features of construction hereinafter specified and particularly pointed out in the claims.

Referring to the drawings:—Figure 1 is a perspective view of a combined planter and fertilizer distributer constructed in accordance with my invention. Fig. 2 is a vertical longitudinal sectional view of the same. Fig. 3 is a transverse section. Fig. 4 is a plan view of the drum or cylinder and one of its slides, said slide being in position to drill grain and simultaneously drop fertilizer. Fig. 5 is a similar view, the slide being in position to distribute grain broadcast.

Like numerals of reference indicate like parts in all the figures of the drawings.

In practice, I construct a rectangular frame of suitable timbers, the same consisting of the front and rear cross-bars 1 and 2, respectively, which are connected by the opposite side-bars 3. To the front cross-bar 1 is connected the draft-tongue 4, as is usual, and to the rear ends of the side-bars clips 5, are secured and project therebeyond.

In rear of the planter I preferably locate a rectangular harrow-frame, the same consisting of the front and rear harrow-bars 6 and 7, and the opposite side connecting-bars 8, the two being connected between the side-bars by diagonally-disposed harrow-bars 9. The harrow-bars 9 and 7 are provided with, in this instance, the usual rigid-teeth, but of course other forms of teeth may be substituted if desired.

The front ends of the side-bars 8 of the harrow-frame are provided with clips 10, which are recessed at right-angles to the clips 5 of the planter-frame and loosely interlock therewith, so that as the planter-frame is moved the harrow-frame is dragged thereafter. A pair of standards 11, are notched to embrace and rise from the rear harrow-bars 7 and are connected at their upper ends by a cross-rung 12, which also passes through a pair of ordinary handles 13, whose front ends are secured to the front bar 6 of the harrow-frame, and whose rear ends are shaped to form suitable holds and diverge as shown. The opposite side-bars 3 of the planter-frame are provided at their centers with journal-boxes or bearings 14, and loosely journaled therein are the ends of a transverse shaft 15, which ends are cylindrical, whereas, the intermediate portion of the shaft between the bearings is rectangular. Adjacent to the cylindrical ends of the shaft there is mounted thereon a pair of ground-wheels 16, and the same are of suitable diameter.

Mounted upon the shaft between the ground-wheels is, in this instance, an octagonal hopper or cylinder 17, though the same may be polygonal, that is have any number of sides. The number of sides, however, should be a multiple of the number of inches in circumference of the wheels, as for instance, if the wheels are seventy-two inches, as in the present instance they are supposed to be, the hopper should be eight-sided or octagonal, or if the wheels were thirty-six inches the hopper would be four-sided or rectangular, the object being in the present instance to provide for a dropping of the seed when drilling at distances nine inches apart.

Each of the sides of the drum or hopper is provided with, in this instance a series of five seed-discharging holes 18, the same being rectangular and arranged a uniform distance apart. Of course this number of openings may be increased, but in the present instance I have shown them in accordance with the length of the hopper. By having five seed-openings it will be seen that one will be located at the longitudinal center of the hopper, and just to the right of this I provide a fertilizer discharging-opening 20. The interior of the hopper is provided with a series of three partitions, 21ᵃ in this instance, the same being located between the openings 18, and thus forming a series of annular compartments 21.

Upon each of the faces or sides of the cylinder near the ends thereof there is secured a number of keepers 22, each of which is provided with a thumb-screw 23, or other binding-medium, and in each pair of keepers there is mounted for loose sliding and adapted to be secured in position by said thumb-screws a slide 24. The slide 24 is provided with a series of five recesses 25, formed in that edge thereof adjacent to the openings, and, as will be obvious, may be moved so as to cover said openings or partially or wholly expose the same. At one side of its central opening it is provided with an elongated recess 26, which is located at one side of the central notch 25 of the slide. This recess 26 has projecting from its inner edge rearwardly, and located at one side of the center thereof a projection 27, which produces at opposite sides notches 28 and 29. By moving the slide to the left so that the projection 27 is over the fertilizer-opening 20, it will be seen that all of the grain openings will be closed, and by continuing such movement it will be seen that all of the grain-openings will be opened to a greater or less degree in accordance with the amount of discharge of grain desired and that the projection 27 will cover the opening 20. Now by moving the slide to the right all of the grain-openings, with the exception of the central one, will be closed, while said central grain opening will be opened, as will also, the fertilizer-discharge 20, the projection 27 being moved from over the same. In any of the positions named the thumb-screws will serve to maintain the slides in position. By putting grain of any kind in the hopper which is accomplished in the manner hereinafter described, it will be seen that the slide being moved to the left will adapt the machine for broadcast sowing, the grain being distributed evenly and with what might be termed a partial feed in addition to its natural gravitating feed, in that the tumbling of the hopper together with the fact that it is polygonal in cross-section will serve to shake the grain down through the openings. When the slide has been moved to the right, however, it will be seen that all the compartments are closed with the exception of the two central compartments, and in one of these is placed grain while in the other is placed fertilizer, so that fertilizer and grain may be simultaneously sown. The action of the harrow upon the deposited grain and fertilizer is the same as in other fertilizers and hence needs no particular mention.

Any means may be provided for giving access to the interior of the hopper. In the present instance I have provided a series of openings 30, in one side of the hopper and in line therewith a pair of keepers 31, having binding-screws 32, which impinge upon and maintain in proper adjustment a slide 33, having openings 34, agreeing in distance apart with those in the hopper and therefore adapted to be moved into alignment or register therewith, if so desired, for the purpose of admitting grain and fertilizer.

From the foregoing description in connection with the accompanying drawings, it will be seen that I have provided a very cheap, simple, and effective machine adapted to be conveniently changed and thereby adapted for drilling grain and simultaneously therewith dropping fertilizer or for dropping grain broadcast, and in either instance to subsequently cover the same. It will furthermore be seen that by closing one or more of the series of openings the distance between the grain-drills may be increased.

Having described my invention, what I claim is—

1. In a machine of the class described, the combination with the rectangular frame, the hopper mounted therein, and means for rotating the hopper, of the U-shaped clips at the rear ends of the frame, the rectangular harrow-frame, the U-shaped clips at the front end thereof engaging with those of the planter-frame, the diagonal bars arranged in the harrow-frames, the teeth depending from the diagonal bars and rear harrow-bar, and suitable handles, substantially as specified.

2. In a machine of the class described, the combination with the rectangular planter-frame having opposite side bearings, a loosely journaled shaft, and ground-wheels mounted thereon and moving therewith, of the hopper secured upon this shaft and polygonal in cross-section, partitions arranged at intervals within the hopper, a series of grain openings formed in the several faces or sides of the hopper, and a fertilizer-distributer opening arranged at one side of the central opening of each series, U-shaped keepers mounted on the hopper and aligning with the openings, seed-slides mounted in the keepers, binding devices mounted in the keepers and adapted to impinge upon the slides, each of said slides being provided with a series of uniformly spaced apart notches 25 and at one side of the central notch with an elongated recess 26 from which extends a projection 27 located at one side of the center of said recess, all combined and operated as specified.

In testimony that I claim the foregoing as my own I have hereto affixed my signature in the presence of two witnesses.

JOSEPH PIPES.

Witnesses:
JNO. F. DUTTON,
O. B. MORELAND.